(12) United States Patent
Kudo et al.

(10) Patent No.: US 7,679,860 B2
(45) Date of Patent: Mar. 16, 2010

(54) THIN FILM MAGNETIC HEAD WITH LAYER HAVING HIGH SATURATION MAGNETIC FLUX DENSITY, AND MAGNETIC STORAGE APPARATUS

(75) Inventors: Kazue Kudo, Kanagawa (JP); Gen Oikawa, Kanagawa (JP); Youji Maruyama, Saitama (JP); Hiromi Shiina, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 779 days.

(21) Appl. No.: 11/372,835

(22) Filed: Mar. 9, 2006

(65) Prior Publication Data
US 2006/0203385 A1 Sep. 14, 2006

(30) Foreign Application Priority Data
Mar. 9, 2005 (JP) ............................. 2005-064886

(51) Int. Cl.
G11B 5/147 (2006.01)
G11B 5/31 (2006.01)
(52) U.S. Cl. ................ 360/125.01; 428/812; 428/815.2
(58) Field of Classification Search . 360/125.01–125.7; 428/812, 815.2
See application file for complete search history.

(56) References Cited

U.S. PATENT DOCUMENTS

| 6,723,449 | B2 * | 4/2004 | Kudo et al. ............... 428/811.2 |
| 6,797,415 | B2 * | 9/2004 | Yamaguchi et al. ......... 428/812 |
| 2004/0053077 | A1 * | 3/2004 | Kawasaki et al. ..... 428/694 MT |
| 2005/0053802 | A1 * | 3/2005 | Miyake et al. ........... 428/694 T |
| 2007/0177299 | A1 * | 8/2007 | Kudo et al. ................. 360/125 |

FOREIGN PATENT DOCUMENTS

| JP | 06-089422 | | 3/1994 |
| JP | 06-346202 | | 12/1994 |
| JP | 07-003489 | | 1/1995 |
| JP | 08-241503 | | 9/1996 |
| JP | 2821456 | | 3/1999 |
| JP | 2000173014 | A * | 6/2000 |
| JP | 2002-280217 | | 9/2002 |
| JP | 2003022909 | A * | 1/2003 |
| JP | 2004152454 | A * | 5/2004 |

OTHER PUBLICATIONS

English-machine translation of Kudo et al. (JP 2004-152454 A), published on May 27, 2004.*

* cited by examiner

Primary Examiner—William J Klimowicz
(74) Attorney, Agent, or Firm—Townsend and Townsend and Crew LLP; Rambod Nader

(57) ABSTRACT

Embodiments of the invention provide a magnetic film capable of providing a higher saturation magnetic flux density as compared with the conventional one, a process of forming the magnetic film, a thin film magnetic head that makes use of the magnetic film, and a magnetic disk drive having this thin film magnetic head. In one embodiment, a magnetic film contains Co, Ni, and Fe, and its composition is such that $10 \leq Co < 20$ wt %, $0 \leq Ni \leq 2$ wt %, and $80 < Fe \leq 90$ wt %. This magnetic film is a plating layer formed by electroplating. The face interval variation of crystal surface perpendicular to the layer surface relative to a crystal surface parallel to the layer surface is about 0.4% or more, whereby the saturation magnetic flux density (Bs) is greater than about 2.4 T.

15 Claims, 8 Drawing Sheets

(a)

(b)

THIN FILM MAGNETIC HEAD WITH LAYER HAVING HIGH SATURATION MAGNETIC FLUX DENSITY, AND MAGNETIC STORAGE APPARATUS

CROSS-REFERENCES TO RELATED APPLICATIONS

This application claims priority from Japanese Patent Application No. JP2005-064886, filed Mar. 9, 2005, the entire disclosure of which is incorporated herein by reference.

BACKGROUND OF THE INVENTION

The present invention relates to a magnetic film of a high saturation magnetic flux density, a fabrication method therefor, a thin film magnetic head utilizing the magnetic film, and a magnetic disk drive provided with the thin film magnetic head.

With increased recording density of magnetic disk drives, recording media has been increased in coercivity. As a magnetic core material for a write head, a material is required accordingly that shows a high saturation magnetic flux density (Bs) and a strong magnetic field enough to sufficiently write information in a medium with high coercivity.

Materials that exhibit a high saturation magnetic flux density (Bs) include CoNiFe (Bs>1.7 T) having a Bs higher than that of Ni45Fe55 (Bs:1.5 teslas (T)), which is adopted presently as a magnetic core material as described in Patent Documents 1, 2, 3, and 4. Patent Document 5 also discloses a process of forming a plated film having a high Bs by making use of, as a plating solution composition, a plating solution to which no saccharin sodium is added. Furthermore, in Patent Document 6, the use of a two-element (Co and Fe) leads to the attainment of making the Bs higher. See Patent Document 1: Japanese Patent Laid-open No. 6-89422; Patent Document 2: Japanese Patent Laid-open No. 8-241503; Patent Document 3: Japanese Patent Laid-open No. 6-346202; Patent Document 4: Japanese Patent Laid-open No. 7-3489; Patent Document 5: Japanese Patent No. 2821456; Patent Document 6: Japanese Patent Laid-open No. 2002-280217.

In the above-described prior art, however, even though a CoNiFe-based material as a material exhibiting a high saturation magnetic flux density (Bs) is produced by electroplating, a sufficiently high saturation magnetic flux density cannot be obtained yet.

BRIEF SUMMARY OF THE INVENTION

The present invention has been made in view of the above-described problem, and it is a feature of the invention to provide a magnetic film capable of obtaining a higher saturation magnetic flux density as compared with the conventional one, a fabrication method for the magnetic film, a thin film magnetic head that makes use of the magnetic film, and a magnetic disk drive provided with this thin film magnetic head.

In accordance with an aspect of the present invention, a magnetic film containing Co, Ni, and Fe is characterized in that it is formed by plating, composition of the magnetic film is such that $10 \leq Co \leq 40$ wt %, $0 < Ni \leq 2$ wt % and $60 \leq Fe \leq 90$ wt %, a face interval variation of crystal surface perpendicular to a layer surface relative to a crystal surface parallel to the layer surface is 0.4% or more, and a saturation magnetic flux density of the magnetic film is greater than 2.4 teslas.

In addition, the above magnetic film is characterized in that it is a layer of a body-centered crystal single phase, and $I(220)/\Sigma I \leq 7$ when the sum of peak intensity of each diffraction peak in X-ray diffraction is $\Sigma I$ and a peak intensity of the face I(220) is I(220).

Further, the above magnetic film is characterized in that a crystal particle diameter is less than about 30 nm.

In accordance with another aspect of the present invention, a process of forming a magnetic film containing Co, Ni, and Fe is characterized in that electroplating is carried out using a plating solution having pH of 2.0 or less and a maximum current density greater than 100 mA/cm$^2$; a composition of the magnetic film is such that $10 \leq Co \leq 40$ wt %, $0 < Ni \leq 2$ wt %, and $60 \leq Fe \leq 90$ wt %; and a saturation magnetic flux density of the magnetic film is greater than 2.4 teslas.

In accordance with another aspect of the present invention, a thin film magnetic head is characterized in that the above thin film magnetic head has a magnetic film adjacent to a magnetic gap. In specific embodiments, the magnetic film preferably has a thickness of less than about 0.5 μm.

Additionally, the above thin film magnetic head is characterized in that a magnetic gap layer comprises a non-magnetic metal, and serves as a plated underlying layer of the magnetic film.

The present invention further provides a magnetic disk drive characterized in that the magnetic disk drive includes the above thin film magnetic head.

DETAILED DESCRIPTION OF THE INVENTION

Embodiments for carrying out the present invention will be set forth below.

A magnetic film according to an embodiment of the present invention contains Co, Ni, and Fe, and its composition is $10 \leq Co \leq 40$ wt %, $0 < Ni \leq 2$ wt %, and $60 \leq Fe \leq 90$ wt %. This magnetic film is a plated film formed by electroplating. Its face interval variation of a crystal surface perpendicular to the film surface relative to a crystal surface parallel to the film surface is about 0.4% or more. As such, the saturation magnetic flux density (Bs) is greater than about 2.4 teslas. In this case, the face interval variation is defined as a value that is obtained by dividing the difference between the surface interval of a crystal surface perpendicular to the film surface and the surface interval of a crystal surface parallel to the layer surface, by the surface interval of a crystal surface parallel to the film surface.

Also, the magnetic film according to an embodiment of the present invention is a single-phase film of crystal with body-centered cubic structure (body-centered crystal). In addition, it is preferable for the magnetic film of the invention in view of Bs improvement that $I(220)/\Sigma I \leq 7$ if the sum of the peak intensity of each diffraction peak in X-ray diffraction is $\Sigma I$ and the peak intensity of the face I(220) is I(220) and that the crystal grain diameter is less than about 30 nm.

Figure 1:
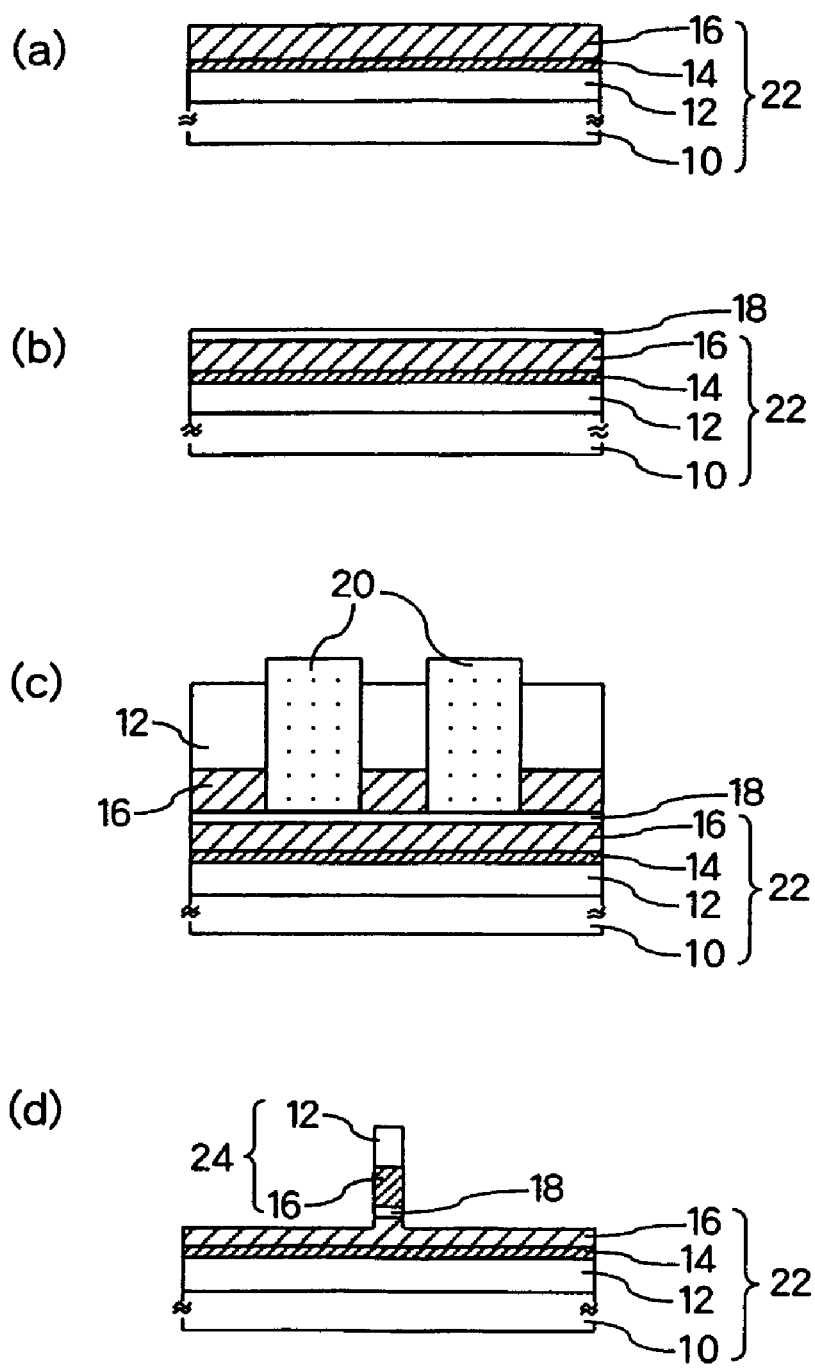
FIGS. 1(a)-(d) are diagrams indicating the steps of fabricating a thin film magnetic head by use of a magnetic film according to an embodiment of the present invention.

FIGS. 1(a) to 1(d) show the steps of producing a thin film magnetic head for which the above magnetic film according to the present invention is used. In addition, FIG. 1 shows a write head, and omits a read head. In FIG. 1(a), first, a 46NiFe layer 12 is formed on a substrate 10, and is patterned in a desired shape. In this case, a desired shape may be formed using a resist previously, and then plating may be applied thereto. Further, an insulating layer is sputtered thereon, and its surface is flattened by CMP (Chemical Mechanical Polishing). Thereafter, Ar gas is introduced into the spattering chamber at an ultimate vacuum of $5 \times 10^{-5}$ Pa or more, and then a CoNiFe underlying layer 14 is formed using a CoNiFe alloy target by DC or RF spattering. At this time, a non-magnetic metal layer of about 5 nm may be formed as a contact layer under the CoNiFe underlying layer 14.

Next, the resulting material is fabricated in a desired shape using a resist frame, and then a CoNiFe plated layer 16 is formed on the underlying layer 14 by electroplating using a plating solution containing Co, Ni, and Fe as ions and also 1.5 g/l of saccharin sodium as a stress relief agent, under the plating conditions as indicated in Table 1 below. In this step, the pH of the plating solution is preferably less than about 2.0, and the plating is suitably carried out in the range of about $1.5 \leq pH \leq 1.9$. Additionally, the electric current used in electroplating may be either direct current or pulse current. The composition of the CoNiFe plated layer 16 thus formed includes about 30 wt % of Co, 1 wt % of Ni, and 69 wt % of Fe. This CoNiFe plated layer is a magnetic film according to the present invention. In this way, a lower magnetic core 22 is formed. Also, first, a plated layer having a Bs lower than that of the plated layer of the present invention is formed, and then the CoNiFe plated layer of the present invention may be formed on this plated layer.

Figure 2:
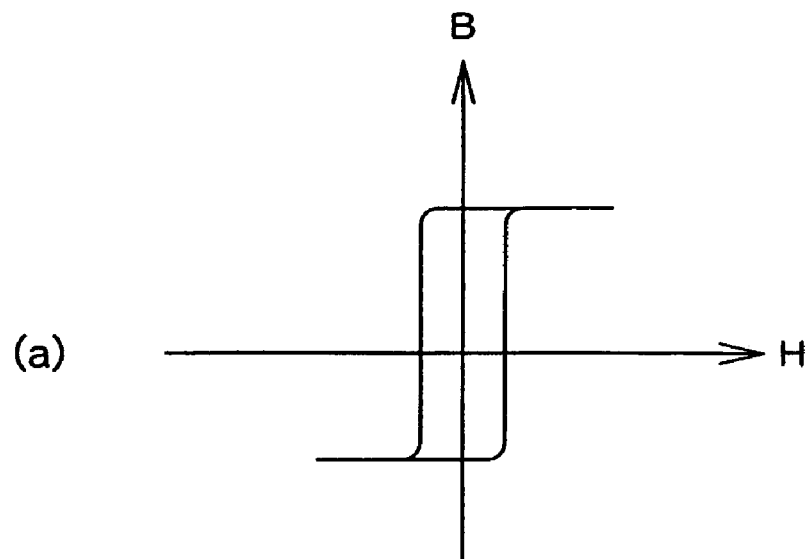
FIGS. 2(a)-(b) are diagrams indicating the B-H loops of a magnetic film according to an embodiment of the present invention.
Figure 2:
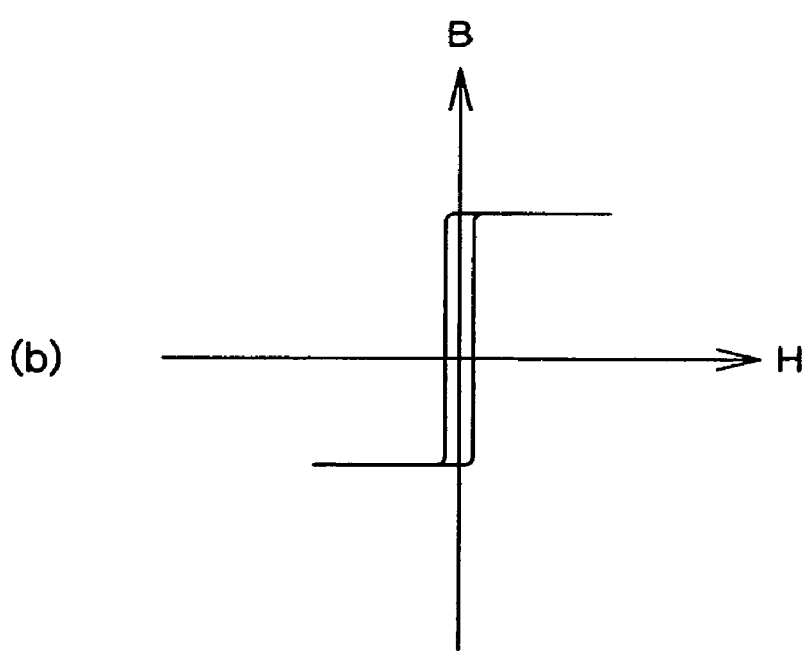

In addition, the B-H loop of the above CoNiFe plated layer 16 is shown in FIG. 2(a); when this layer is heat treated, the coercive force and the anisotropic magnetic field are small as shown in FIG. 2(b). In FIGS. 2(a) and 2(b), the abscissa is the magnetic field H that is applied to the layer and the coordinate is the magnetic flux density B. The results indicated in FIG. 2(b) are those of the layer after it has been subjected to heat treatment at 250° C. for three hours.

TABLE 1

| Plating solution temperature | 30° C. |
| pH | 1.9 |
| Max. current density | 135 mA/cm² |
| Co⁺⁺ | 4.0 g/l |
| Fe⁺⁺ | 11.5 g/l |
| Ni⁺⁺ | 1.7 g/l |
| Saccharin Sodium | 1.5 g/l |

Next, in FIG. 1(b) on the CoNiFe plated layer 16 is formed a magnetic gap layer 18. The magnetic gap layer 18 utilizes non-magnetic film made of, for example, Rh, Ru, Au, Pt, NiP, or the like.

Next, in FIG. 1(c), on the magnetic gap layer 18, a resist frame 20 for forming an upper magnetic core is formed, and this resulting material is patterned in a desired shape. Then a second CoNiFe plated layer 16 and a second 46NiFe layer 12 are formed layer by layer by plating. In this case, the thickness of the second CoNiFe plated layer 16 is preferably 0.5 µm or less. The magnetic gap layer 18 serves as a plated underlying layer for the second CoNiFe plated layer 16. The second CoNiFe plated layer 16 for forming an upper magnetic core 24 also is formed as in FIG. 1(a). This CoNiFe plated layer 16 is a magnetic film according to the present invention. Moreover, in this case, although the second 46NiFe layer 12 is used for a portion of the upper magnetic core and the first 46NiFe layer 12 is used for a portion of the lower magnetic core 22, a FeNi layer may be used that has a composition of $10 \leq Ni \leq 80$ and $20 \leq Fe \leq 90$.

Next, in FIG. 1(d), the resist frame 20 is removed, and a trimming step is carried out in order to process the upper and lower magnetic cores to a predetermined track width. Thus, an upper magnetic core 24 is formed.

According to the steps of FIGS. 1(a) to 1(d) as discussed above, a thin film magnetic head is produced that has a magnetic film, according to the present invention, adjacent the magnetic gap.

Figure 3:
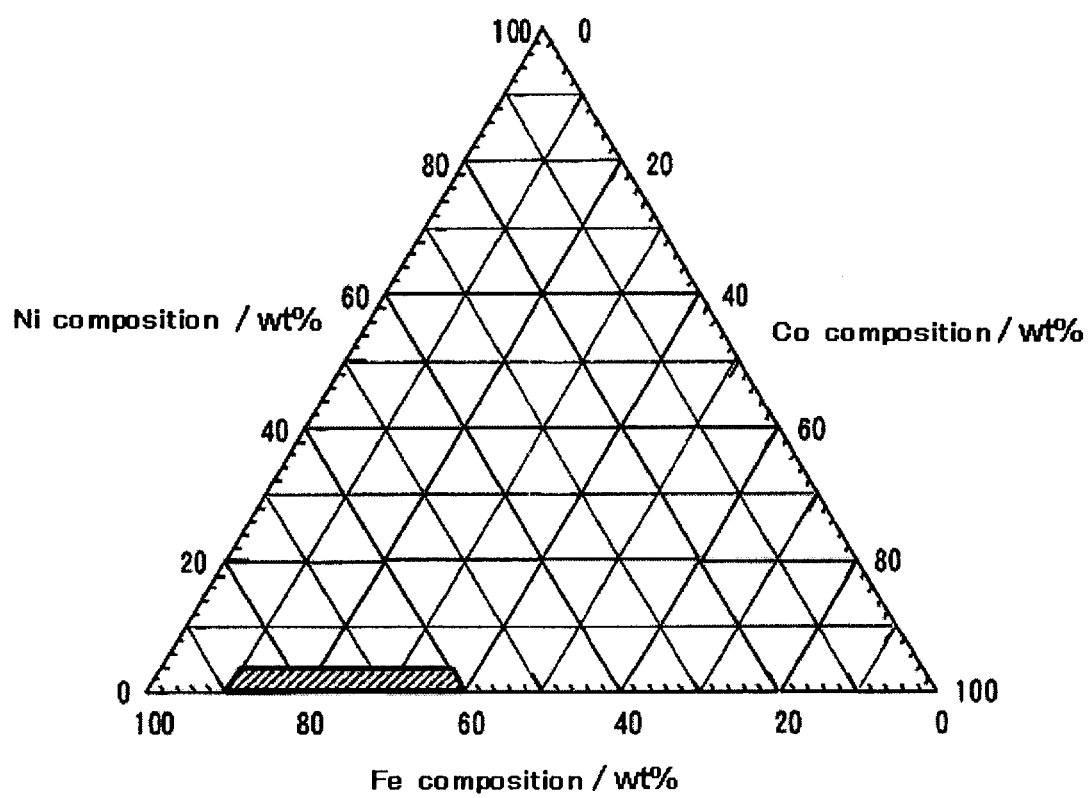
FIG. 3 is a ternary system diagram illustrating the composition range of Co, Ni and Fe of a magnetic film obtained by the present invention.

FIG. 3 is a ternary system diagram illustrating the composition range of Co, Ni and Fe of a magnetic film obtained by the present invention. In the composition range indicated in FIG. 3, when 40 wt %<Co and Fe<60 wt %, and Co<10 wt %, 90 wt %<Fe and 2 wt %<Ni, the coercive force is large, whereby the properties as soft magnetic films are deteriorated. In addition, when 2 wt %<Ni, Bs<2.3 T. Also, if Ni=0 wt %, for example, when the corrosion potential is determined, the natural immersion potential of a composition is low as compared with a film containing 1 wt % Ni. In other words, since corrosion resistance deteriorates, 0 wt %<Ni is needed.

Thus, it is needed to form a CoNiFe film of the composition range indicated in FIG. 3, i.e., $10 \leq Co \leq 40$ wt %, $0 < Ni \leq 2$ wt %, and $60 \leq Fe \leq 90$ wt %. Electroplating conditions therefor are suitably the conditions of the range shown in Table 2. In addition, the range of the conditions indicated in Table 2 may include the conditions shown in Table 1.

TABLE 2

| Plating solution temperature | 25-35° C. |
| pH | 1.7-2.0 |
| Max. current density | 100-700 mA/cm² |
| Co⁺⁺ | 2-10 g/l |
| Fe⁺⁺ | 5-25 g/l |
| Ni⁺⁺ | 0-4 g/l |
| Saccharin Sodium | 0.5-2.0 g/l |

Figure 4:
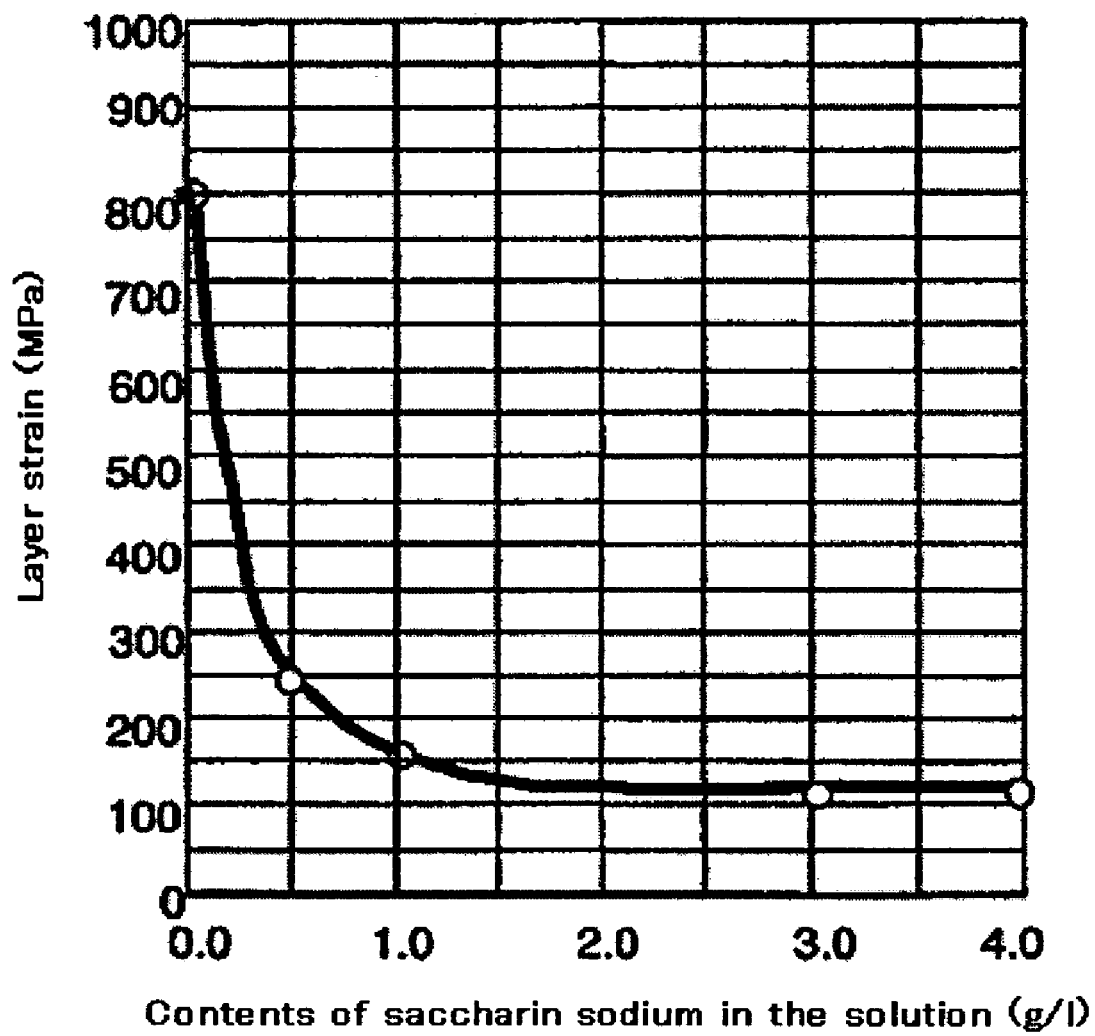
FIG. 4 is a diagram indicating the relationship between the amount of addition of saccharine sodium and the layer stress of a CoNiFe layer.

As described above, the present invention is characterized in that a film is formed from a plating solution containing saccharin sodium as a stress relief agent in the plating solution when the CoNiFe plated film 16 is formed. Plating under such plating conditions enables the formation of a film having a thickness of 3 µm or more as well. In addition, as shown in FIG. 4, the addition of saccharin sodium of about 0.5 g/l can reduce the film stress to about 200 MPa. However, addition of that of 2.5 g/l or more causes the film stress to remain unchanged. Also, when the amount of the saccharin sodium is in excess in the plating solution, the amount of S in the layer is increased, whereby the corrosion resistance is lowered. Accordingly, the amount of addition of saccharin sodium is optimally from 0.5 to 2.0 g/l.

As illustrated in FIG. 1(d), the lower magnetic core 22 is fabricated by forming, on the substrate 10, the first 46NiFe layer 12, the first CoNiFe underlying layer 14, and the CoNiFe plating layer 16 in that order. Additionally, the upper magnetic core 24 is provided opposite to the lower magnetic core 22 through the magnetic gap layer 18, and fabricated by forming, on the magnetic gap layer 18, the second CoNiFe plating layer 16 and the second 46NiFe layer 12 in that order.

More specifically, the lower magnetic core 22 includes the CoNiFe underlying layer 14 and the first CoNiFe plating layer 16 formed thereon; the upper magnetic core 24 includes the magnetic gap layer 18 that serves also as the underlying layer, and the second CoNiFe plating layer 16 formed thereon. Also, the CoNiFe plating layers 16 each preferably contain CoNiFe of composition having the range of $10 \leq Co \leq 40$ wt %, $0 \leq Ni \leq 2$ wt %, and $60 \leq Fe \leq 90$ wt %. This composition range above can generate a magnetic field that is appropriate for high recording density.

Figure 5:
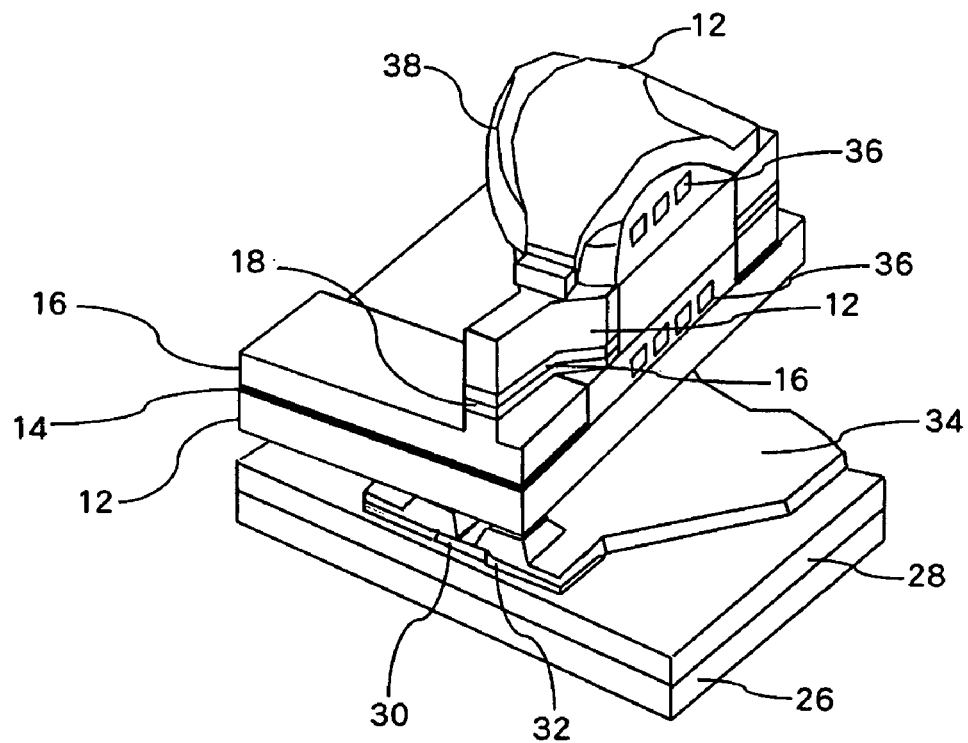
FIG. 5 is a sectional view of a thin film magnetic head using a magnetic film according to an embodiment of the present invention.

FIG. 5 is a cross-sectional view of a read-write separation type thin film magnetic head employing the above-described CoNiFe underlying layer 14 and CoNiFe plating layer 16 as a portion of the upper magnetic core 24 and that of the lower magnetic core 22 as indicated in FIG. 1(d).

The fabrication of the thin film magnetic head indicated in FIG. 5 involves, first, forming a lower magnetic shield layer 28 and a lower magnetic gap layer (not shown) on a non-magnetic substrate 26, and forming an MR or GMR sensor as a read device 30 thereon. Next, a magnetic domain control layer 32 and an electrode layer 34 are formed, thus fabricating a read head. Thereafter, an upper magnetic gap layer and an upper magnetic shield layer (not shown) are formed.

Next, the lower magnetic core of the write head is formed on top of the above-described upper magnetic gap layer. The fabrication of the lower magnetic core involves forming the first 46NiFe layer 12 by plating, forming the CoNiFe underlying layer by spattering to 100 nm, and subsequently forming the first CoNiFe plating layer 16 to a predetermined thickness in a plating solution of pH<2.0. In this case, for formation of an electric current applying coil 36 in the same plane and improvement of the surface smoothness, the insulating layer is formed to have a thickness larger than the plating layer thickness of the CoNiFe plating layer 16, and then subjected to a chemical mechanical polishing (CMP) step.

Next, the magnetic gap layer 18 is formed. Thereafter, a resist frame for forming the upper magnetic core is fabricated, and the second CoNiFe plating layer 16 and second 46NiFe layer 12 are formed in that order by plating. The resist frame is removed, and a trimming step is carried out to process the upper and lower magnetic cores in specified track widths. Thereafter, the coil 36 for applying recording electric current and an organic insulating layer 38 are formed, and the second 46NiFe layer 12 is frame plated thereon.

The thin film magnetic head fabricated as noted above exhibits good recording properties; the present inventors have confirmed that the thin film magnetic head can sufficiently record information even in, for example, a high-coercivity medium having a coercivity of 4000 Oe (318,300 A/m) or more.

Figure 6:
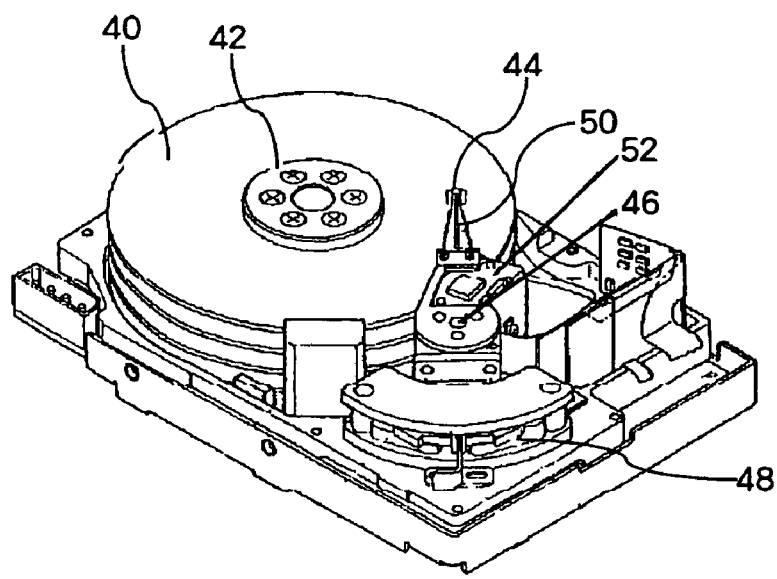
FIG. 6 is a block diagram of a magnetic disk drive having a thin film magnetic head according to an embodiment of the present invention.

FIG. 6 shows a construction of a magnetic disk drive provided with the above thin film magnetic head. In FIG. 6, the magnetic disk drive includes: a magnetic disk 40 adapted to record information; a motor 42 that rotates the magnetic disk 40; a magnetic head 44 that writes information in the magnetic disk 40 and reads information from the magnetic disk 40; an actuator 46 that positions the magnetic disk 40 at a target position; and a voice coil motor 48. In addition, the magnetic disk drive includes the magnetic head 44, a spring 50 that maintains the submicron space between the head and the magnetic disk 40, and a guide arm 52 to which the spring 50 is fixed and which is driven by the actuator 46 and voice coil motor 48. Furthermore, the magnetic disk drive is provided with a magnetic disk rotation control system, a head positioning control system, and a read/write signal processing system (not shown) as well.

Figure 7:
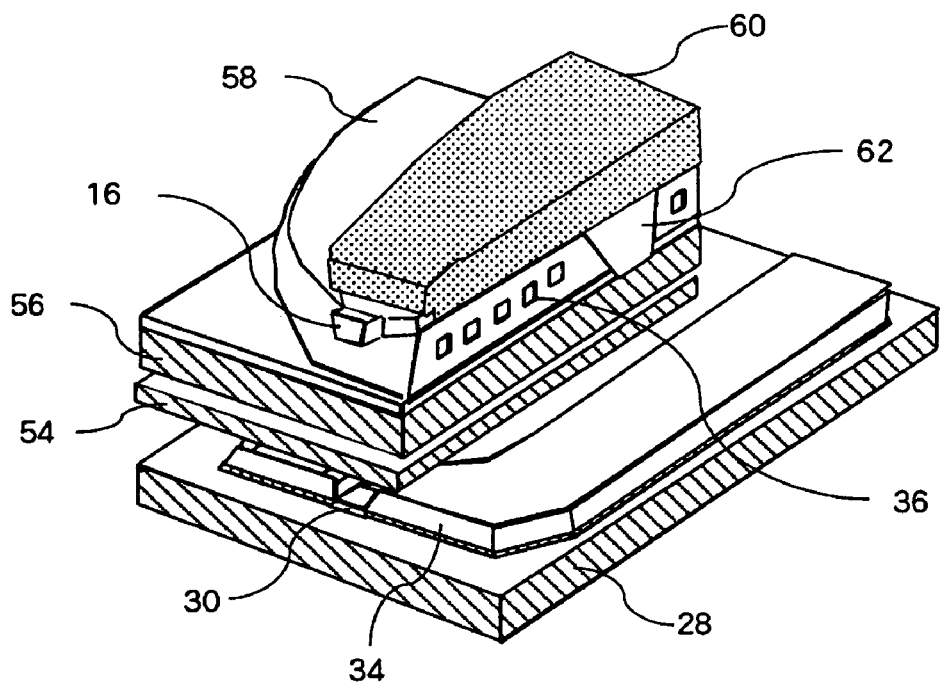
FIG. 7 is a sectional view of a perpendicular magnetic recording type thin film magnetic head using a magnetic film according to an embodiment of the present invention.

FIG. 7 is a cross-sectional view of a perpendicular magnetic recording type thin film magnetic head that uses the CoNiFe plating layer 16 as a main magnetic pole piece. In FIG. 7, a GMR sensor as the reproducing device 30 and the electrode layer 34 are formed on the lower magnetic shield layer 28. Also, an upper magnetic shield layer 54 and a return pole 56 are formed thereover, and further a CoNiFe plating layer 16 as the main magnetic pole is formed thereover via an insulating layer 58. In addition, on the CoNiFe plating layer 16 is formed a yoke portion 60 and in portions of the insulating layer 58 are formed the coils 36 and a back gap 62 are formed at part of the insulating layer 58.

In the perpendicular magnetic recording type thin film magnetic head shown in FIG. 7, after fabrication of the CoNiFe plating layer 16 as the main magnetic pole, the yoke portion 60 may be fabricated. Alternatively, at first, the yoke portion 60 may be fabricated, and planarized by CMP, and then the CoNiFe plating layer 16 may be formed. It has been confirmed that the thin film magnetic head fabricated in this manner is capable of attaining a recording density of 150 $Gb/in^2$ (23.3 $Gb/cm^2$).

Next, examples of the present invention will be set forth below. In addition, the examples below are illustrative of the invention, and the invention is by no means limited to the examples.

EXAMPLE 1

Determination of the Relationship Between the Maximum Electric Current Density Used for Electroplating and the Saturation Magnetic Flux Density of the Magnetic Film Electroplating was carried out under the conditions of Table 1 as depicted above by changing only the maximum electric current density, and the resulting saturation magnetic flux density of the formed magnetic film (the CoNiFe plating layer) was determined. The results are shown in FIG. 8.

Additionally, the saturation magnetic flux density is obtained by determining the amount of magnetization for an application magnetic field of 1 KOe (79 KA/m), and converting the amount of magnetization into an amount of magnetization per unit volume.

Figure 8:
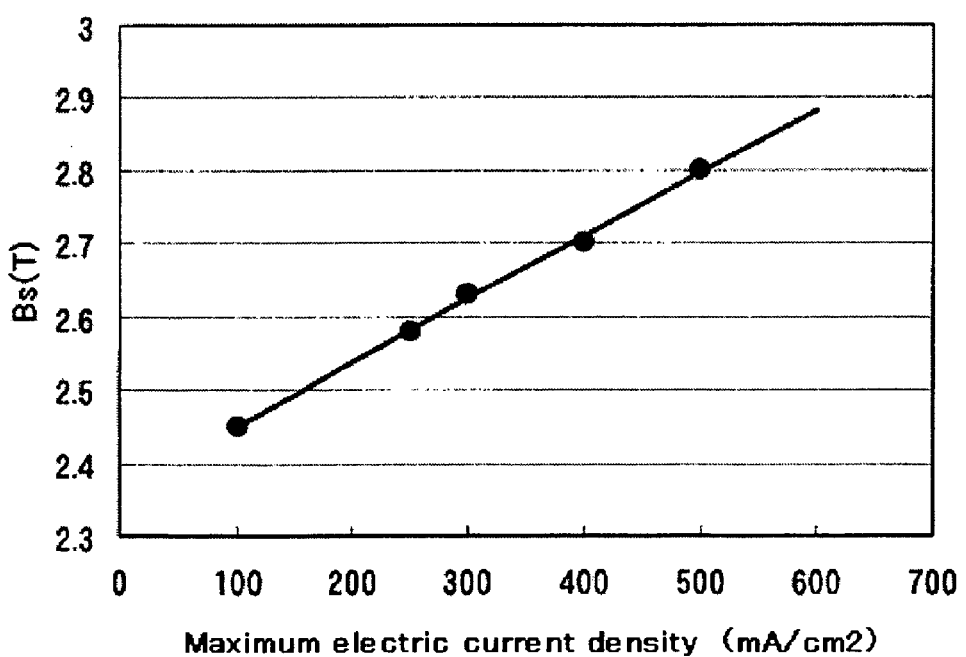
FIG. 8 is a diagram indicating the relationship between the maximum electric current density used for electroplating and the saturation magnetic flux density of a magnetic film.

FIG. 8 shows that the saturation magnetic flux density of the magnetic film exceeds about 2.4 T with the maximum electric current density falling in the range larger than 100 $mA/cm^2$. Hence, when a magnetic film according to the present invention is formed by electroplating, the maximum electric current density is suitably set to a value larger than 100 $mA/cm^2$.

EXAMPLE 2

Determination of the Surface Interval Variation of a Crystal Constituting a Magnetic Film Magnetic films according to the present invention were formed using three maximum electric current densities.

Condition 1: 115 $mA/cm^2$
Condition 2: 130 $mA/cm^2$
Condition 3: 150 $mA/cm^2$ In addition, a magnetic film is formed as a comparative example using the following maximum electric current density.

Condition 4: 9 mA/cm²

The following describes the determination method. Each of the above four magnetic films is subjected to the determination of the face intervals d from the crystal face ($\psi$=0 deg) parallel to the sample surface to the crystal face inclined 40 degrees toward the original face at intervals of 10 degrees by performing the 2θ/θ scan in the wide angle X-ray diffraction 2θ/θ mode using a peak bcc (220), which is detected at a sufficient intensity, in the conditions of the offsets of 0 deg, 10 deg, 20 deg, 30 deg, and 40 deg given to the θ axis.

Figure 9:
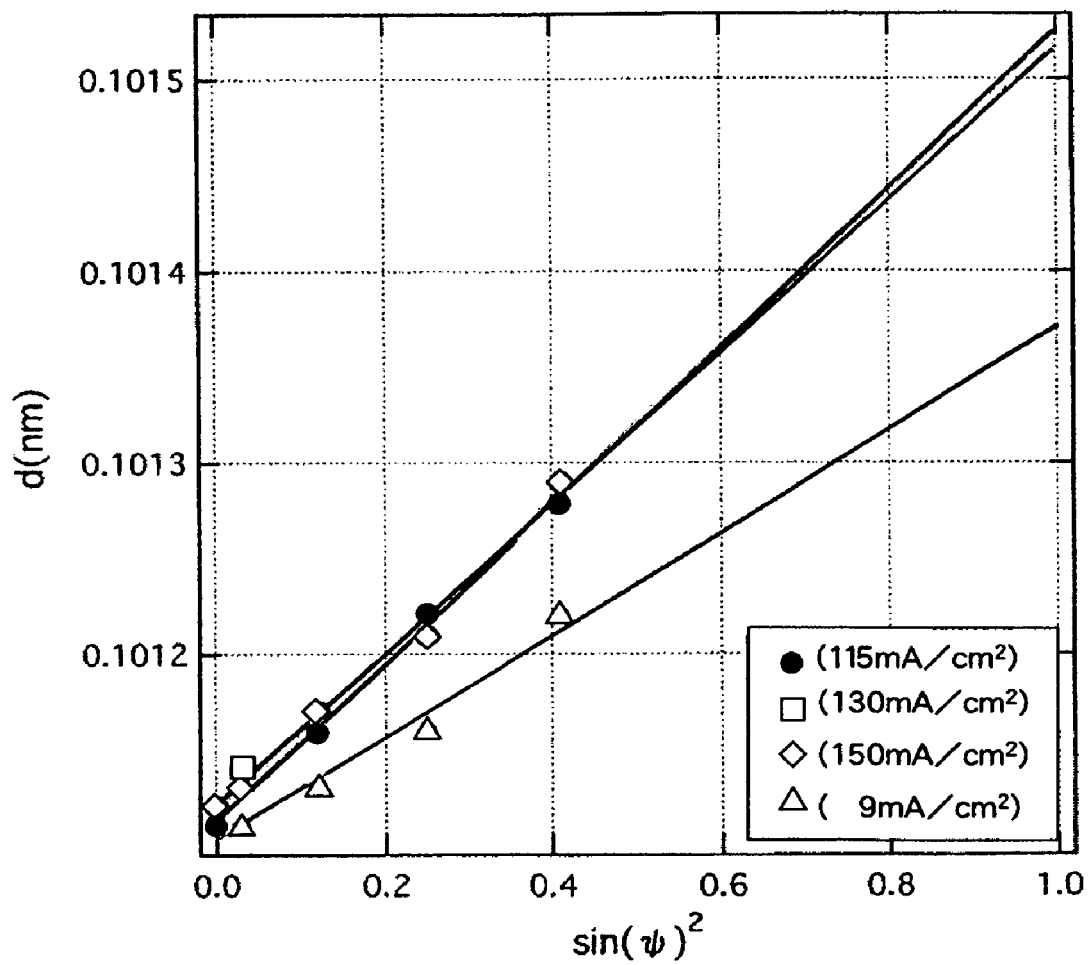
FIG. 9 is a diagram indicating the plotted results of the peak diffraction angle of the X-ray diffraction and the face interval, for the determination of the face interval variations of magnetic films according to an embodiment of the present invention.

After the diffraction angle of the peaks and the face intervals d are evaluated, d vs. $\sin(\psi)^2$ is plotted. The results are illustrated in FIG. 9. These results are approximated in terms of the linear line a+bx, the face intervals of the face ($\psi$=90 deg) vertical to the sample surface are extrapolated, where $\sin(\psi)^2$=1 at the face vertical to the sample surface, and $\sin(\psi)^2$=0 at the face parallel to the sample surface.

From the results above, the variation of face interval (amount of strain) is calculated by the following equation.

Face interval variation=$b$={$d$(Face interval of the face vertical to the sample surface)−$d$(Face interval of the face parallel to the sample surface)}/$d$(Face interval of the face parallel to the sample surface) [Equation 1]

When the face interval variations were evaluated from the above equation on the basis of the results indicated in FIG. 9, the variations were each 0.4% or more for magnetic films according to the present invention.

EXAMPLE 3

Determination of the Overwrite of a Thin Film Magnetic Head

The four magnetic films formed in Example 2 were used for the upper magnetic core and the lower magnetic core to fabricate a thin film magnetic head, the overwrite of which was determined for comparison. The results are illustrated in FIG. 10.

Figure 10:
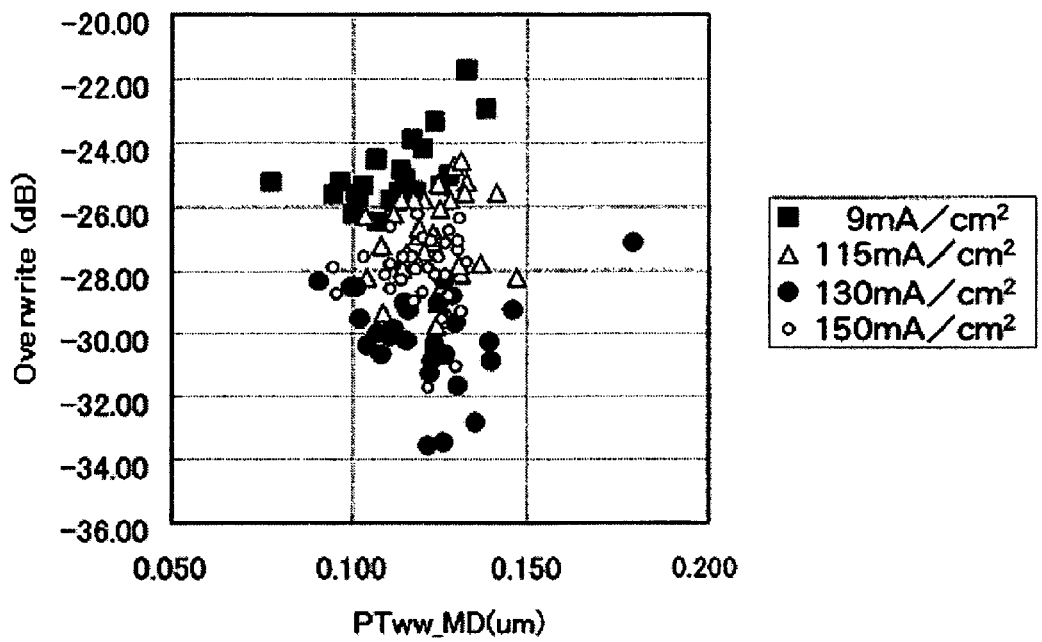
FIG. 10 is a diagram indicating the determination results of overwrite of the thin film magnetic heads.

In FIG. 10, the coordinate indicates the overwrite (dB) and the abscissa indicates the magnetic recording width (Ptw-w_MD (μm)) upon recording in the hard disk. FIG. 10 shows that the thin film magnetic heads for which magnetic films according to the present invention have improvements in overwrite by from 2 to 5 dB as compared with the thin film magnetic head for which the conventional magnetic head.

EXAMPLE 4

Determination of I(220)/ΣI of the Magnetic Films

Figure 11:
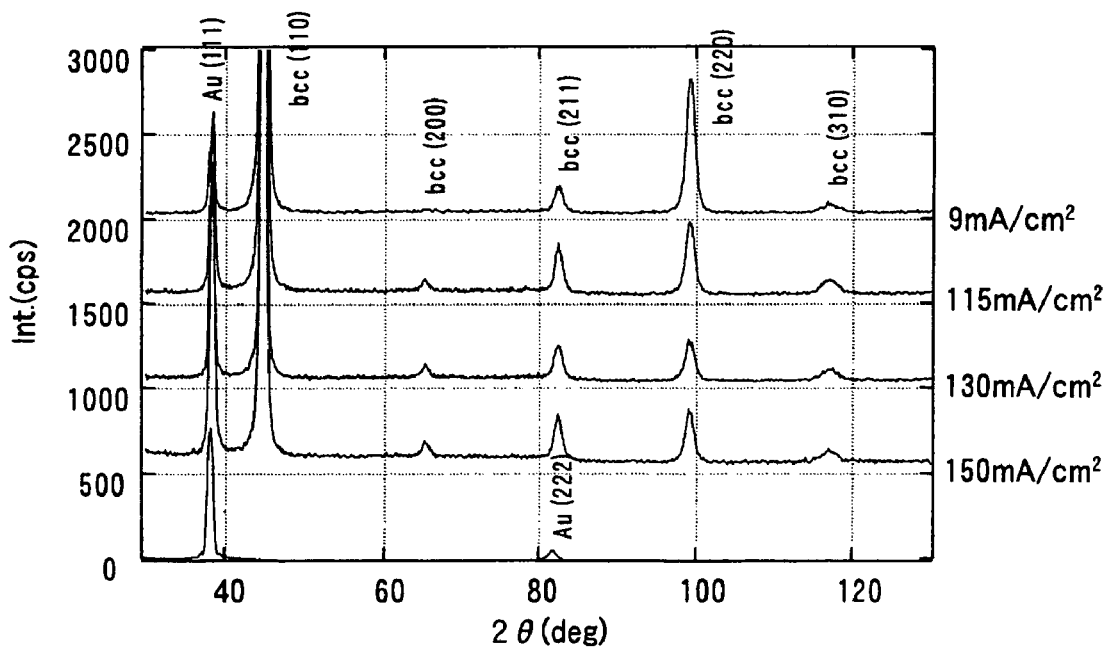
FIG. 11 is a diagram indicating the results of the broad angle X-ray diffraction 2θ/θ scans of the magnetic films according to an embodiment of the present invention.

FIG. 11 indicates the broad angle X-ray diffraction 2θ/θ scans of the four magnetic films formed in Example 2. From these results, the values of the integration intensity ratio I(220)/ΣI were obtained when the integration intensity of the (220) peak is I(220) and the total sum of the integration intensities is ΣI. The results are shown in Table 3.

TABLE 3

| Max. electric current density | I(220)/ΣI |
|---|---|
| 9(ref) | 7.25 |
| 115 | 6.25 |
| 130 | 6.00 |
| 150 | 5.34 |

Table 3 shows that the magnetic films according to the present invention is I(220)/ΣI≦7.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic film containing Co, Ni, and Fe, wherein the magnetic film is formed by plating, a composition of the magnetic film is such that 10≦Co<20 wt %, 0<Ni≦2 wt %, and 80<Fe≦90 wt %, a face interval variation of crystal surface perpendicular to a layer surface relative to a crystal surface parallel to the layer surface is about 0.4% or more, and a saturation magnetic flux density of the magnetic film is greater than about 2.4 teslas.

2. A magnetic film according to claim 1, wherein the magnetic film is a layer of a body-centered crystal single phase, and I(220)/ΣI≦7 where the sum of peak intensity of each diffraction peak in X-ray diffraction is ΣI and a peak intensity of the face I(220) is I(220).

3. A thin film magnetic head comprising a magnetic film according to claim 2 at a location adjacent to a magnetic gap thereof.

4. A thin film magnetic head of claim 3, wherein the magnetic film has a thickness of 0.5 μm or less.

5. A thin film magnetic head of claim 3, wherein the magnetic gap layer comprises a non-magnetic metal, and serves as a plated underlying layer for the magnetic film.

6. A magnetic disk drive comprising the thin film magnetic head according to claim 3.

7. A magnetic film according to claim 1, wherein a crystal particle diameter is less than about 30 nm.

8. A thin film magnetic head comprising a magnetic film according to claim 7 at a location adjacent to a magnetic gap thereof.

9. A thin film magnetic head of claim 8, wherein the magnetic film has a thickness of 0.5 μm or less.

10. A thin film magnetic head of claim 8, wherein the magnetic gap layer comprises a non-magnetic metal, and serves as a plated underlying layer for the magnetic film.

11. A magnetic disk drive comprising the thin film magnetic head according to claim 8.

12. A thin film magnetic head comprising a magnetic film according to claim 1 at a location adjacent to a magnetic gap thereof.

13. A thin film magnetic head of claim 12, wherein the magnetic film has a thickness of 0.5 μm or less.

14. A thin film magnetic head of claim 12, wherein the magnetic gap layer comprises a non-magnetic metal, and serves as a plated underlying layer for the magnetic film.

15. A magnetic disk drive comprising the thin film magnetic head according to claim 12.

* * * * *

UNITED STATES PATENT AND TRADEMARK OFFICE
CERTIFICATE OF CORRECTION

PATENT NO. : 7,679,860 B2
APPLICATION NO. : 11/372835
DATED : March 16, 2010
INVENTOR(S) : Kudo et al.

It is certified that error appears in the above-identified patent and that said Letters Patent is hereby corrected as shown below:

In the Claims:

Claim 5, column 8, line 37, please delete "gap layer" and insert -- gap --

Claim 10, column 8, line 49, please delete "gap layer" and insert -- gap --

Claim 14, column 8, line 59, please delete "gap layer" and insert -- gap --

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,679,860 B2  Page 1 of 1
APPLICATION NO. : 11/372835
DATED : March 16, 2010
INVENTOR(S) : Kazue Kudo et al.

It is certified that error appears in the above-identified patent and that said Letters Patent is hereby corrected as shown below:

In Column 3, Line 16: after the number "7", please insert --%--
    In Column 7, Table 3, Line 62: after the number "7.25", please insert --%--
    in Column 7, Table 3, Line 63: after the number "6.25", please insert --%--
    In Column 8, Table 3, Line 5: after the number "6.00", please insert --%--
    In Column 8, Table 3, Line 6: after the number "5.34", please insert --%--
    In Column 8, Line 10: after the number "7" and before ".", please insert --%--
    In Column 8, Claim 2, Line 28: after the number "7", please insert --%--

Signed and Sealed this

Thirteenth Day of July, 2010

David J. Kappos
*Director of the United States Patent and Trademark Office*